United States Patent
Chollet et al.

(10) Patent No.: US 11,593,614 B2
(45) Date of Patent: Feb. 28, 2023

(54) IMAGE PROCESSING NEURAL NETWORKS WITH SEPARABLE CONVOLUTIONAL LAYERS

(71) Applicant: Google LLC, Mountain View, CA (US)

(72) Inventors: Francois Chollet, Mountain View, CA (US); Andrew Gerald Howard, Mountain View, CA (US)

(73) Assignee: Google LLC, Mountain View, CA (US)

( * ) Notice: Subject to any disclaimer, the term of this patent is extended or adjusted under 35 U.S.C. 154(b) by 926 days.

(21) Appl. No.: 16/338,963

(22) PCT Filed: Oct. 6, 2017

(86) PCT No.: PCT/US2017/055581
§ 371 (c)(1),
(2) Date: Apr. 2, 2019

(87) PCT Pub. No.: WO2018/067962
PCT Pub. Date: Apr. 12, 2018

(65) Prior Publication Data
US 2021/0027140 A1 Jan. 28, 2021

Related U.S. Application Data

(60) Provisional application No. 62/405,181, filed on Oct. 6, 2016.

(51) Int. Cl.
*G06N 3/04* (2006.01)
*G06N 3/08* (2006.01)
(Continued)

(52) U.S. Cl.
CPC ........... *G06N 3/0454* (2013.01); *G06K 9/627* (2013.01); *G06N 3/08* (2013.01); *G06V 10/44* (2022.01);
(Continued)

(58) Field of Classification Search
CPC .... G06V 40/169; G06V 10/454; G06V 10/44; G06K 9/627; G06N 3/0454; G06N 3/08
See application file for complete search history.

(56) References Cited

U.S. PATENT DOCUMENTS

2016/0171346 A1 6/2016 Han et al.
2016/0196672 A1* 7/2016 Chertok ............... G06V 10/454
382/156

(Continued)

FOREIGN PATENT DOCUMENTS

CN 101303689 A 11/2008
CN 102054269 A 5/2011
(Continued)

OTHER PUBLICATIONS

EP Summons to Attend Oral Proceeding in European Application No. 17790905.8, dated Jul. 29, 2020, 9 pages.
(Continued)

*Primary Examiner* — Tadesse Hailu
(74) *Attorney, Agent, or Firm* — Fish & Richardson P.C.

(57) ABSTRACT

A neural network system is configured to receive an input image and to generate a classification output for the input image. The neural network system includes: a separable convolution subnetwork comprising a plurality of separable convolutional neural network layers arranged in a stack one after the other, in which each separable convolutional neural network layer is configured to: separately apply both a depthwise convolution and a pointwise convolution during processing of an input to the separable convolutional neural network layer to generate a layer output.

26 Claims, 5 Drawing Sheets

(51) Int. Cl.
  *G06K 9/62* (2022.01)
  *G06V 40/16* (2022.01)
  *G06V 10/44* (2022.01)
(52) U.S. Cl.
  CPC .......... *G06V 10/454* (2022.01); *G06V 40/169* (2022.01)

(56) References Cited

U.S. PATENT DOCUMENTS

| | | | | |
|---|---|---|---|---|
| 2017/0032222 | A1* | 2/2017 | Sharma | G06V 10/449 |
| 2017/0270406 | A1* | 9/2017 | Visser | G06N 3/04 |
| 2017/0300785 | A1* | 10/2017 | Merhav | G06T 7/0002 |
| 2017/0301077 | A1* | 10/2017 | Merhav | G06T 7/0002 |
| 2017/0337467 | A1* | 11/2017 | Kadav | G08B 29/186 |
| 2017/0337471 | A1* | 11/2017 | Kadav | G06K 9/6228 |
| 2018/0096226 | A1* | 4/2018 | Aliabadi | G06K 9/6219 |

FOREIGN PATENT DOCUMENTS

| | | |
|---|---|---|
| CN | 103824054 A | 5/2014 |
| CN | 105243398 A | 1/2016 |
| CN | 105574827 A | 5/2016 |
| CN | 105678232 A | 6/2016 |
| CN | 105681628 | 6/2016 |
| CN | 105681628 A | 6/2016 |
| CN | 105938560 A | 9/2016 |
| JP | H08-240870 | 9/1996 |
| WO | WO 2016/033506 | 3/2016 |

OTHER PUBLICATIONS

JP Office Action in Japanese Application 2019-518553, dated Jul. 20, 2020, 9 pages (with English translation).
Ioffe et al, "Batch Normalization" Accelerating Deep Network Training by Reducing Internal Covariate Shift Proceedings of the 32nd International Conference on Machine Learning, 2015, 9 pages.
Abadi et al, "TenserFlow: Large-scale machine learning on heterogeneous systems" 2015, [retrieved on Jul. 1, 2019], retrieved from: URL <tenserflow.com>, 1 page.
Clevert et al, "Fast and accurate deep network learning by exponential linear units" arXiv, Dec. 2015, 14 pages.
He et al, "Deep residual learning for image recognition" arXiv, Dec. 2015, 12 pages.
Hinton et al, "Distilling the knowledge in a neural network" arXiv, Mar. 2015, 9 pages.
Krizhevsky et al, "Imagenet classification with deep convolutional neural networks" Aug. 2014, [retrieved on Jul. 1, 2019], retrieved from: URL<https://papers.nips.cc/paper/4824-imagenet-classification-with-deep-convolutional-neural-networks.pdf>, 9 pages.
LeCun et al, "Learning algorithms for classification" A comparison on handwritten digit recognition May 2005, [retrieved on Jul. 1, 2019] retrieved from: URL<http://yann.lecun.com/exdb/publis/pdf/lecun-95a.pdf>, 16 pages.
Lin et al, "Network in network" arXiv, Dec. 2013, 9 pages.
Polyak et al, "Acceletation of stochastic approximation by averaging" Society for Industrial and Applied Mathematics, Jul. 1992, 18 pages.
Russakovsky et al, "Imagenet large scale visual recognition challenge" arXiv, Dec. 2014, 37 pages.
Simonyan et al, "Very deep convolutional networks for large-scale image recognition" arXiv, Dec. 2014, 13 pages.
Szegedy et al, "Inception-v4, inception-resnet and the impact of residual connections on learning" arXiv, Aug. 2016, 12 pages.
Szegedy et al, "Going deeper with convolutions" IEEE Conference on Computer Vision, Mar. 2015, 9 pages.
Szegedy et al, "Rethinking the inception architecture for computer vision" arXiv, Dec. 2015, 10 pages.
Howard, "Mobilenets" Efficient convolutional neual networks for mobile vision applications arXiv, Apr. 2017, 9 pages.
Jin et al, "Flattened convolutional neural networks for feedforward acceleration" arXiv, Dec. 2014, 9 pages.
Mamalet et al, "Simplifying ConvoNets for Fast Learning" International Conference on Artificial Neural, Aug. 2017, 8 pages.
Sifre, "Rigid-motion scattering for image classification" Dec. 2014, [retrieved on : Jul. 1, 2019] retrieved from:URL<https://www.di.ens.fr/data/publications/papers/phd_sifre.pdf>, 128 pages.
Sifre, "Rotation, scaling and deformation invariant scattering for texture discrimination" IEEE, 2013, 8 pages.
Vanhoucke [online], Learning visual representations at scale Presented at ICLR, 2014, retrieved on Jul. 1, 2019, <https://www.youtube.com/watch?v=VhLe-u0M1a8>, 1 page (Video Submission).
Wang et al, "Factorized convolutional neural networks", arXiv, Aug. 2016, 10 pages.
EP Office Action in European Application No. 17790905, dated Mar. 20, 2020, 8 pages.
SG Examination Report in Singapore Application No. 10201708268W, dated Dec. 7, 2019, 3 pages.
KR Office Action in Korean Application No. 10-2019-7012961, dated Jul. 20, 2021, 12 pages (with English translation).
JP Office Action in Japanese Application No. 2019-518553, dated Nov. 24, 2020, 9 pages (with English translation).
International Preliminary Report on Patentability in International Appln. No. PCT/US2017/055581, dated Jan. 25, 2019, 18 pages.
International Search Report and Written Opinion in International Appln. No. PCT/US2017/055581, dated Jan. 11, 2018, 18 pages.
CN Office Action in Chinese Appln. No. 201780061438.2, dated Oct. 20, 2022, 15 pages (with English Translation).

* cited by examiner

IMAGE PROCESSING NEURAL NETWORKS WITH SEPARABLE CONVOLUTIONAL LAYERS

CROSS-REFERENCE TO RELATED APPLICATION

This application is a National Stage Application under 35 U.S.C. § 371 and claims the benefit of International Application No. PCT/US2017/055581, filed on Oct. 6, 2017, which claims priority to U.S. Provisional Application Ser. No. 62/405,181, filed on Oct. 6, 2016. The disclosure of the prior application is considered part of and is incorporated by reference in the disclosure of this application.

BACKGROUND

This specification relates to processing images using deep neural networks, e.g., convolutional neural networks.

Neural networks are machine learning models that employ one or more layers of nonlinear units to predict an output for a received input. Some neural networks include one or more hidden layers in addition to an output layer. The output of each hidden layer is used as input to another layer in the network, e.g., the next hidden layer or the output layer. Each layer of the network generates an output from a received input in accordance with current values of a respective set of parameters.

Convolutional neural networks generally include convolutional neural network layers and, in some cases, fully-connected neural network layers and other kinds of neural network layers. Convolutional neural network layers have sparse connectivity, with each node in a convolutional layer receiving input from only a subset of the nodes in the next lowest neural network layer. Some convolutional neural network layers have nodes that share weights with other nodes in the layer. Nodes in fully-connected layers, however, receive input from each node in the next lowest neural network layer.

SUMMARY

This specification describes a neural network system implemented as computer programs on one or more computers in one or more locations.

In general, one innovative aspect may be embodied in a neural network system implemented by one or more computers. The neural network system is configured to receive an input image and to generate a classification output for the input image. The neural network system includes: a separable convolution subnetwork comprising a plurality of separable convolutional neural network layers arranged in a stack one after the other, in which each separable convolutional neural network layer is configured to: separately apply both a depthwise convolution and a pointwise convolution during processing of an input to the separable convolutional neural network layer to generate a layer output. The neural network system may further include an output subnetwork configured to receive a separable convolution output generated by the separable convolution subnetwork and to process the separable convolution output to generate the classification output for the input image. The neural network system may further include an input subnetwork configured to receive the input image and to process the input image to generate an initial output. The input subnetwork may include one or more convolutional neural network layers.

The separable convolution subnetwork may include one or more entry modules, in which the entry modules are configured to receive the initial output and to collectively process the initial output to generate an entry output. Each entry module may include: a respective first pass-through convolutional layer configured to process a module input for the entry module to generate a first pass-through output; a respective first stack of separable convolutional neural network layers, in which the layers in the first stack are configured to collectively process the module input to generate a first stack output; a respective max pooling layer configured to perform max pooling on the first stack output to generate a max pooled output; and a respective first concatenation layer configured to concatenate the first pass-through output and the max pooled output to generate an entry module output for the entry module. The separable convolution subnetwork may include three entry modules. The first pass-through convolutional layer may be a 1×1 convolutional layer. The separable convolutional neural network layers in the first stack can be separated by a rectified linear unit activation layer. One or more of the separable convolutional neural network layers in the first stack can be followed by a batch normalization layer.

The separable convolution subnetwork may include one or more middle modules, in which the middle modules are configured to receive the entry output and to collectively process the entry output to generate a middle output. Each middle module may include: a respective second pass-through convolutional layer configured to process a module input for the middle module to generate a second pass-through output; a respective second stack of separable convolutional neural network layers, in which the layers in the second stack are configured to collectively process the module input to generate a second stack output; and a respective second concatenation layer configured to concatenate the second pass-through output and the second stack output to generate a middle module output for the middle module. The separable convolution subnetwork may include eight middle modules. The second pass-through convolutional layer may be a 1×1 convolutional layer. Each separable convolutional neural network layer in the second stack may be preceded by a rectified linear unit activation layer. One or more of the separable convolutional neural network layers in the second stack can be followed by a batch normalization layer.

The separable convolution subnetwork may include an exit module, in which the exit module is configured to receive the middle output and to process the middle output to generate a separable convolution output for the separable convolution subnetwork. The exit module may include: a third pass-through convolutional layer configured to process the middle output to generate a third pass-through output; a third stack of separable convolutional neural network layers, in which the layers in the third stack are configured to collectively process the middle output to generate a third stack output; a third max pooling layer configured to perform max pooling on the third stack output to generate a third max pooled output; and a third concatenation layer configured to concatenate the third pass-through output and the third pooled output to generate a concatenated output. The third pass-through convolutional layer may be a 1×1 convolutional layer. Each separable convolutional neural network layer in the third stack may be preceded by a rectified linear unit activation layer. One or more of the separable convolutional neural network layers in the third stack can be followed by a batch normalization layer. The exit module may further include a fourth stack of separable convolutional neural network layers, in which the layers in the third stack are configured to collectively process the concatenated output to generate a fourth stack output; and an average pooling layer configured to perform average pooling on the fourth stack output to generate the separable convolution output. Each separable convolutional neural network layer in the fourth stack can be followed by a rectified linear unit activation layer. One or more of the separable convolutional neural network layers in the fourth stack can be followed by a batch normalization layer.

Another innovative aspect may be embodied in one or more storage media encoded with instructions that when implemented by one or more computers cause the one or more computers to implement the neural network system as described above.

Another innovative aspect may be embodied in a method including receiving an input image; and processing the input image using the above-described neural network system to generate a classification output for the input image. The method may further include providing the classification output or an output derived from the classification output for presentation to a user.

Particular embodiments of the subject matter described in this specification can be implemented so as to realize one or more of the following advantages. The image processing neural network system as described in this specification can achieve results that match or outperform the state of the art in performing a variety of image processing tasks, e.g., image classification or object recognition. Additionally, the image processing neural network system as described in this specification can achieve results that are comparable to or better than conventional neural networks that have many more parameters and therefore require many more computing resources, i.e., memory and processing time, for storing the parameter values and for processing input images than the image processing neural network system as described in this specification. That is, the image processing neural network system can achieve these results while having a smaller computational footprint, i.e., using less memory and requiring less processing time, than conventional neural networks. Generally, these advantages are realized as a result of stacking multiple separable convolutional layers one after the other in the image processing neural network, i.e., as opposed to stacking conventional convolutional layers or having only a single separable convolutional layer as the input layer of the neural network followed by stacked conventional convolutional layers.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
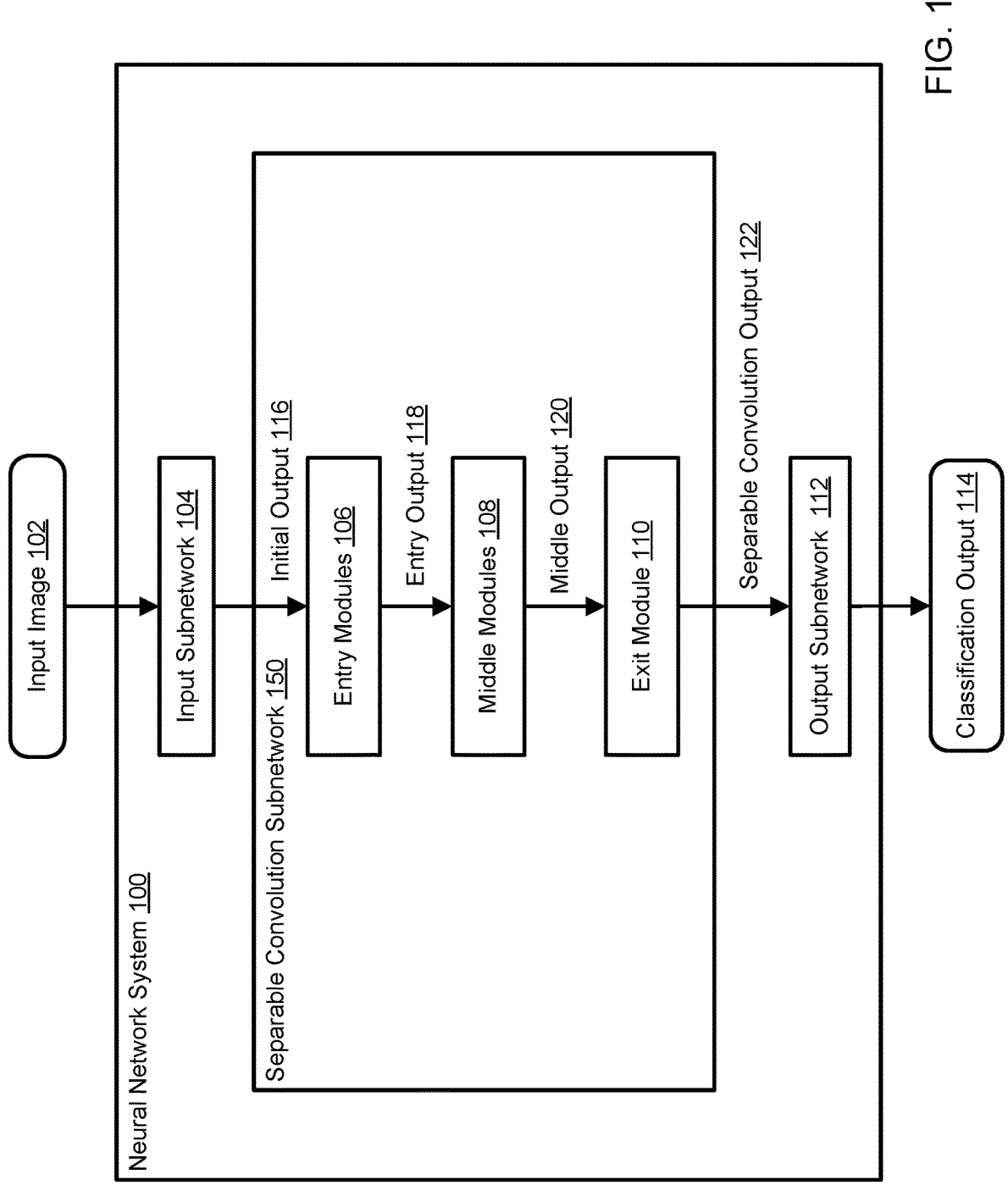
FIG. 1 is a block diagram of an example of a neural network system.

FIG. 1 shows an example of a neural network system 100. The neural network system 100 is an example of a system implemented as computer programs on one or more computers in one or more locations, in which the systems, components, and techniques described below can be implemented.

The neural network system 100 receives an input image 102. The neural network system 100 then processes the input image 102 using a separable convolution subnetwork 150 to generate an output for the input image.

The neural network system 100 can be configured to generate any kind of score, regression, or classification output based on the input image 102, i.e., can be configured to perform any kind of image processing task. The score or classification output generated by the system 100 depends on the task that the neural network system 100 has been configured to confirm. The system 100 can be configured to generate one or more scores or classification outputs at the output layer of the subnetwork 150 or at any appropriate hidden layer of one or more hidden layers of the subnetwork 150. For example, for an image classification or recognition task, the output generated by the neural network system 100 for a given image may be scores for each of a set of object categories, with each score representing the likelihood that the image contains an image of an object belonging to the category. As another example, for an object detection task, the output generated by the neural network system 100 can identify a location, a size, or both, of an object of interest in the input image. As yet another example, the output generated by the neural network system 100 can be the output of one of the hidden layers of the network and can be provided for use as a numeric representation, i.e., a numeric embedding, of the input image.

Generally, the separable convolution subnetwork 150 includes multiple separable convolutional neural network layers arranged in a stack one after the other.

A separable convolutional neural network layer includes a depthwise convolution, i.e. a spatial convolution performed independently over every channel of an input, followed by a pointwise convolution, i.e. a regular convolution with 1×1 windows, projecting the channels computed by the depthwise convolution onto a new channel space. Each separable convolutional neural network layer is configured to separately apply both a depthwise convolution and a pointwise convolution during processing of an input to the separable convolutional neural network layer. For example, a separable convolutional layer may first perform channel-wise spatial convolution, i.e., depthwise convolution, on the received input to generate an intermediate output and then perform 1×1 convolution, i.e., pointwise convolution, on the intermediate output to generate a layer output. As another example, a separable convolutional layer may first perform 1×1 convolution on the received input to generate an intermediate output and then perform channel-wise spatial convolution on the intermediate output to generate a layer output.

In particular, the separable convolution subnetwork 150 includes a sequence of modules including one or more entry modules 106 followed by one or more middle modules 108 followed by an exit module 110. In some implementations, the separable convolution subnetwork 150 includes three entry modules. In some implementations, the subnetwork 150 may include eight middle modules. Each module includes multiple separable convolutional neural network layers arranged in a stack one after the other. Each module is configured to process a module input to generate a module output for the module input. Each module then provides the module output as input to the next module or, if there are no modules following the current module, i.e., if the module is the last module in the sequence, as a separable convolution output, e.g., the separable convolution output 122, of the separable convolution subnetwork 150. Example architectures of an entry module, a middle module, and an exit module are provided in detail below with reference to FIGS. 2-4.

In various implementations, the neural network system 100 includes an input subnetwork, for example, the input subnetwork 104, that is configured to receive the input image 102 and to process the input image 102 to generate an initial output 116. The input subnetwork 104 includes one or more convolutional neural network layers.

The one or more entry modules 110 are configured to receive the initial output 116 and to collectively process the initial output 116 to generate an entry output 118.

The one or more middle modules 108 are configured to receive the entry output 118 and to collectively process the entry output 118 to generate a middle output 120.

The exit module 110 is configured to receive the middle output 120 and to collectively process the middle output 120 to generate a separable convolution output 122 for the separable convolution subnetwork 150.

In various implementations, the neural network system 100 includes an output subnetwork, e.g., the output subnetwork 112, that is configured to receive the separable convolution output 122 as input. The output subnetwork 112 is configured to process the separable convolution output 122 to generate a classification output 114 for the input image 102.

The architecture of the output subnetwork 112 is specific to the task that the neural network system 100 is configured to perform. For example, when the system 100 is performing an image classification task, the output subnetwork 112 includes a softmax layer and, optionally, one or more fully-connected layers preceding the softmax layer, that collectively process the separable convolution output 122 to generate a classification output 114 for the input image 102.

Figure 2:
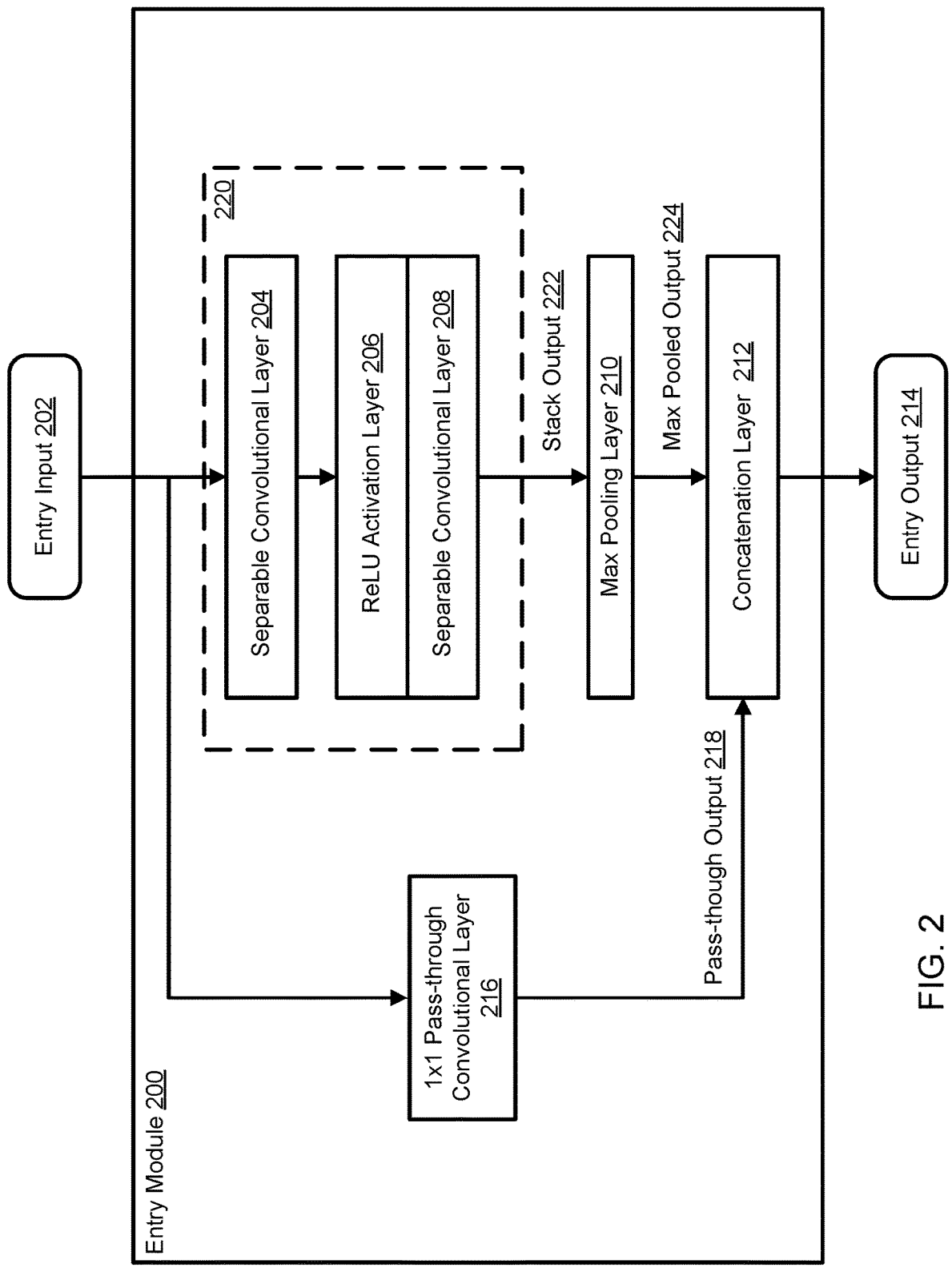
FIG. 2 is a block diagram of an example architecture of an entry module.

FIG. 2 illustrates an example architecture of an entry module 200.

The entry module 200 is configured to receive an entry input 202. In some cases, the entry input 202 is an input image. In some other cases, the entry input 202 is an initial output generated by an input subnetwork from the input image (e.g., the initial output 116 of FIG. 1). In some other cases, the entry input 202 is a module output generated by a previous entry module.

The entry module 200 includes a first pass-through convolutional layer 216 that is configured to process the entry input 202 to generate a first pass-through output 218. The first pass-through convolutional layer 216 is a 1×1 convolutional layer.

The entry module 200 further includes a first stack 220 of separable convolutional neural network layers (e.g., the separable convolutional layer 204 and the separable convolutional layer 208). The separable convolutional neural network layers in the first stack 220 are configured to collectively process the entry input 202 to generate a first stack output 222. In particular, each separable convolutional neural network layer in the first stack 220 is configured to separately apply both a depthwise convolution and a pointwise convolution during processing of an input to the separable convolutional neural network layer to generate a layer output. Each separable convolutional layer then provides the layer output as input to the next separable convolutional layer or, if there are no layers following the current layer, as the first stack output 222.

In some implementations, one or more of the separable convolutional neural network layers in the first stack 220 are preceded by a rectified linear unit (ReLU) activation layer. For example, the separable convolutional layer 208 is preceded by the ReLU activation layer 206. A ReLU activation layer is configured to apply a ReLU activation function to an output of the previous separable convolutional layer to generate a ReLU output that is provided as input to the next separable convolutional layer following the ReLU activation layer.

In some implementations, one or more of the separable convolutional neural network layers in the first stack 220 are followed by a batch normalization layer performing batch normalization. Batch normalization layers enable higher learning rates and robust initialization by making normalization a part of a model architecture and performing the normalization for each training mini-batch of training data. Bath normalization is described in detail in S. ICoffee and C. Szegedy, "*Batch normalization: Accelerating deep network training by reducing internal covariate shift.*" In Proceedings of The 32nd International Conference on Machine Learning, pages 448-456, 2015.

The entry module 200 includes a max pooling layer 210 that is configured to perform max pooling on the first stack output 222 to generate a max pooled output 224.

The entry module 200 further includes a concatenation layer 212 that is configured to concatenate the first pass-through output 218 and the max pooled output 224 to generate an entry output 214 for the entry module 200. For example, the concatenation layer 212 is configured to concatenate tensors generated by the first pass-through convolutional layer 216 and the max pooling layer 210 along the depth dimension to generate a single tensor, i.e. the entry output 214 for the entry module 200.

The entry module output 214 is then provided as input to the next module, which can be another entry module or a middle module.

Figure 3:
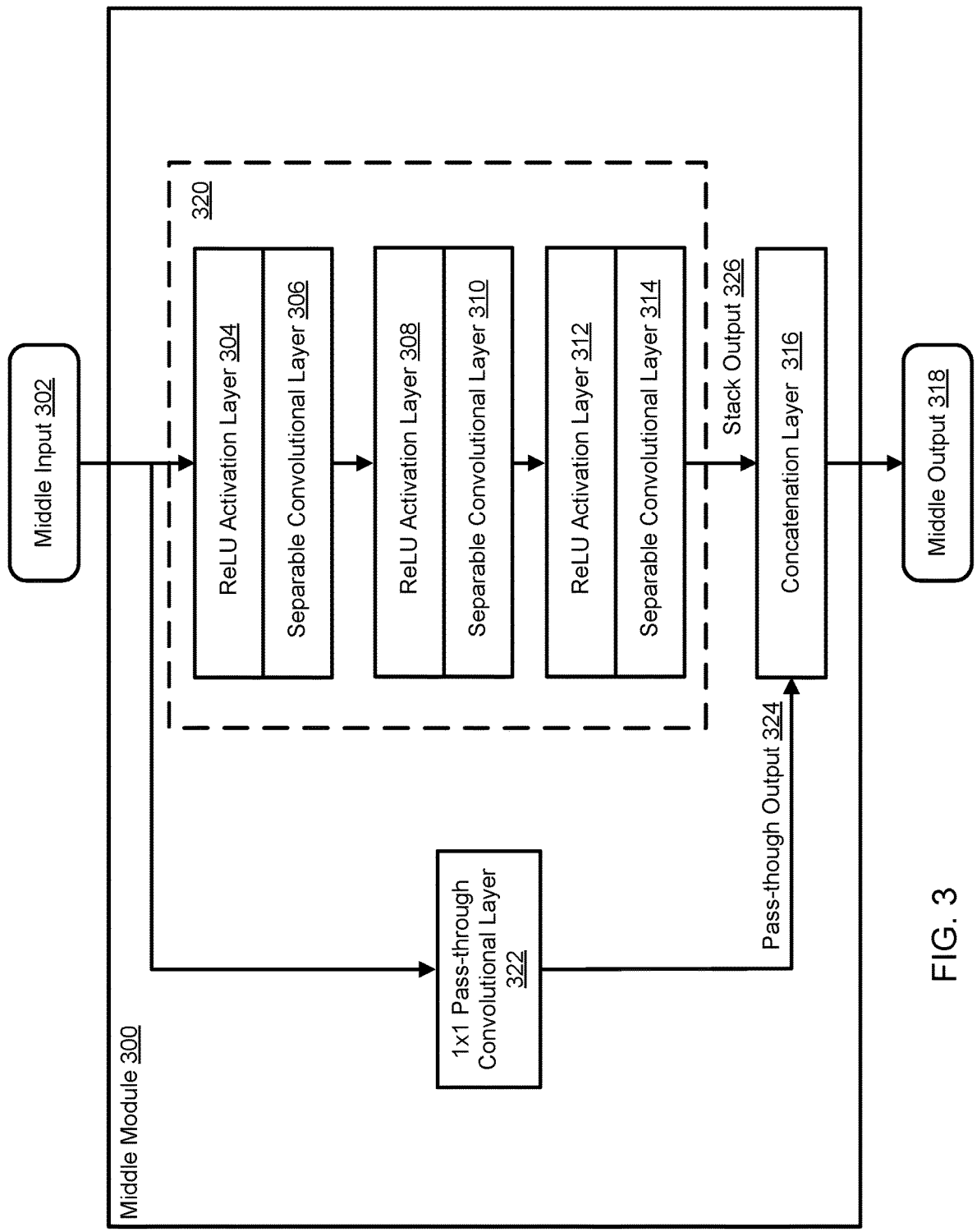
FIG. 3 is a block diagram of an example architecture of a middle module.

FIG. 3 shows an example architecture of a middle module, e.g. the middle module 300. In general, a middle module has more separable convolutional neural network layers than an entry module and does not include a max pooling layer as the entry module.

The middle module 300 is configured to receive a middle input 302. In some cases, the middle input 302 is an entry output generated by one or more previous entry modules, e.g., the entry output 118 generated by entry modules 106 of FIG. 1. In some other cases, the middle input 302 is a module output generated by a previous middle module.

The middle module 300 includes a second pass-through convolutional layer 322 that is configured to process the middle input 302 to generate a second pass-through output 324. The second pass-through convolutional layer 322 is a 1×1 convolutional layer.

The middle module 300 further includes a second stack 320 of separable convolutional neural network layers (e.g., the separable convolutional layers 306, 310, and 314). The separable convolutional neural network layers in the second stack 320 are configured to collectively process the middle input 302 to generate a second stack output 326. In particular, each separable convolutional neural network layer in the second stack 320 is configured to separately apply both a depthwise convolution and a pointwise convolution during processing of an input to the separable convolutional neural network layer to generate a layer output. Each separable convolutional layer then provides the layer output as input to the next separable convolutional layer or, if there are no layers following the current layer, as the second stack output 326.

In some implementations, each of the separable convolutional neural network layers in the second stack 320 is preceded by a ReLU activation layer. For example, the separable convolutional layers 306 is preceded by the ReLU activation layer 304, the separable convolutional layer 310 is preceded by the ReLU activation layer 308, and the separable convolutional layer 314 is preceded by the ReLU activation layer 312.

The first ReLU activation layer (e.g., layer 304) is configured to apply a ReLU activation function to the middle input 302 to generate an intermediate output that is provided as input to the following separable convolutional layer (e.g., the separable convolutional layer 306). Each of the subsequent ReLU activation layers (e.g., the ReLU activation layers 308 and 312) is configured to apply a ReLU activation function to an output of the previous separable convolutional layer to generate an intermediate output that is provided as input to the next separable convolutional layer.

In some implementations, one or more of the separable convolutional neural network layers in the second stack 320 are followed by a batch normalization layer.

The middle module 300 further includes a concatenation layer 316 that is configured to concatenate the second pass-through output 324 and the stack output 326 to generate a middle module output 318 for the middle module 300.

The middle output 318 is provided as input to the next module, which can be another middle module or an exit module.

Figure 4:
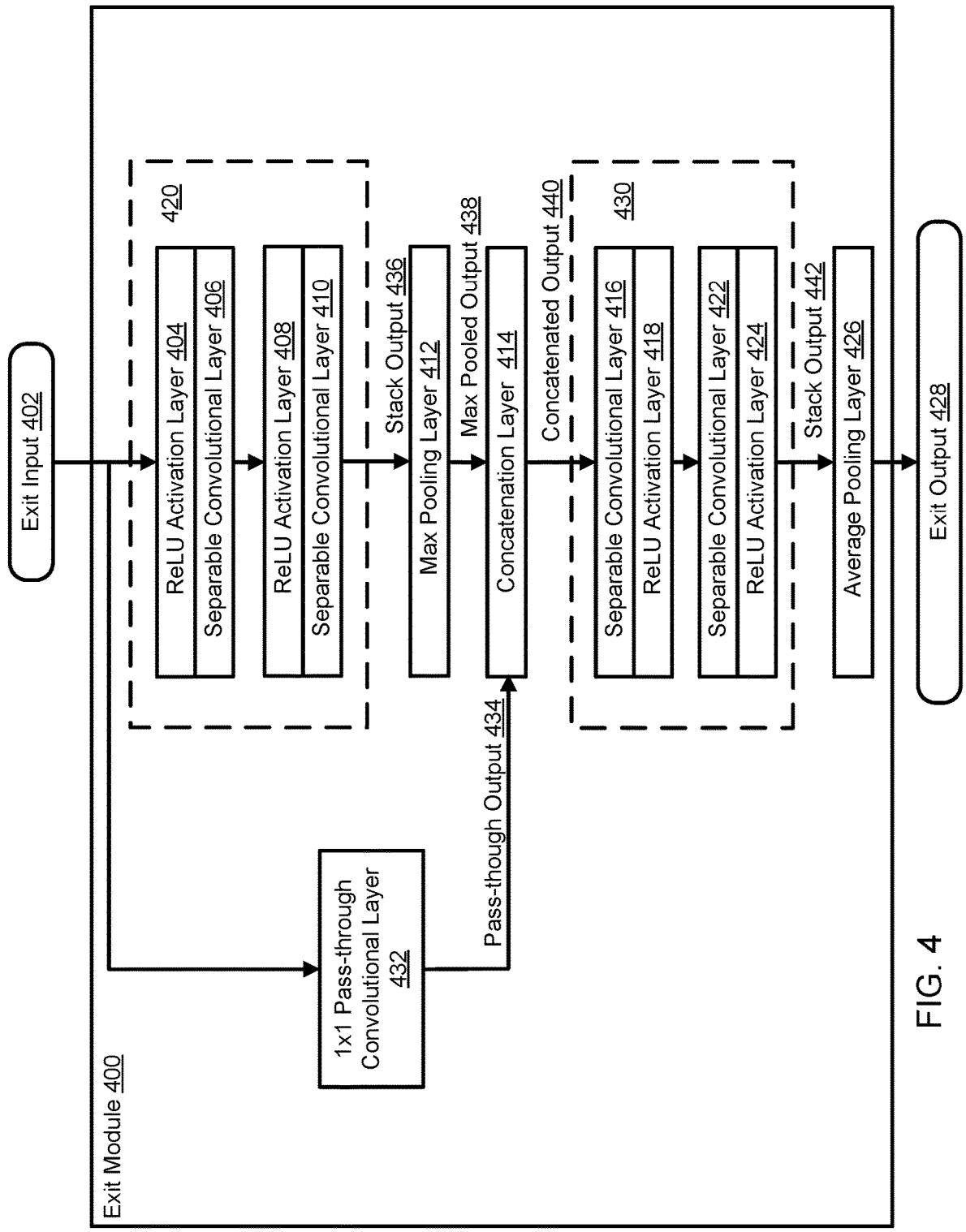
FIG. 4 is a block diagram of an example architecture of an exit module.

FIG. 4 is a block diagram of an example of an exit module 400.

The exit module 400 is configured to receive an exit input 402. The exit input 402 is the module output generated by one or more previous middle modules, e.g., the middle output 120 generated by the middle modules 108 of FIG. 1.

The exit module 400 includes a third pass-through convolutional layer 432 that is configured to process the exit input 402 to generate a third pass-through output 434. The third pass-through convolutional layer 432 is a 1×1 convolutional layer.

The exit module 400 further includes a third stack 420 of separable convolutional neural network layers (e.g., the separable convolutional layers 406 and 410). The separable convolutional neural network layers in the third stack 420 are configured to collectively process the exit input 402 to generate a third stack output 436. In particular, each separable convolutional neural network layer in the third stack 420 is configured to separately apply both a depthwise convolution and a pointwise convolution during processing of an input to the separable convolutional neural network layer to generate a layer output. Each separable convolutional layer then provides the layer output as input to the next separable convolutional layer or, if there are no layers following the current layer, as the third stack output 436.

In some implementations, each of the separable convolutional neural network layers in the third stack 420 is preceded by a ReLU activation layer. For example, the separable convolutional layers 406 is preceded by the ReLU activation layer 404, and the separable convolutional layer 410 is preceded by the ReLU activation layer 408.

The first ReLU activation layer (e.g., layer 404) is configured to apply a ReLU activation function to the exit input 402 to generate an intermediate output that is provided as input to the following separable convolutional layer (e.g., the separable convolutional layer 406). Each of the subsequent ReLU activation layers (e.g., the ReLU activation layer 408) is configured to apply a ReLU activation function to an output of the previous separable convolutional layer to generate an intermediate output that is provided as input to the next separable convolutional layer.

In some implementations, one or more of the separable convolutional neural network layers in the third stack 420 are followed by a batch normalization layer.

The exit module 400 includes a max pooling layer 412 that is configured to perform max pooling on the third stack output 436 to generate a max pooled output 438.

The exit module 400 further includes a concatenation layer 414 that is configured to concatenate the third pass-through output 434 and the max pooled output 438 to generate a concatenated output 440. For example, the concatenation layer 414 is configured to concatenate tensors generated by the first pass-through convolutional layer 432 and the max pooling layer 412 along the depth dimension to generate a single tensor, i.e. the concatenated output 440.

The exit module 400 further includes a fourth stack 430 of separable convolutional neural network layers (e.g. the separable convolutional neural network layers 416 and 422). The layers in the fourth stack are configured to collectively process the concatenated output 440 to generate a fourth stack output 442. In particular, each separable convolutional neural network layer in the fourth stack 420 is configured to separately apply both a depthwise convolution and a pointwise convolution during processing of an input to the separable convolutional neural network layer to generate a layer output. Each separable convolutional layer then provides the layer output as input to the next layer.

In some implementations, each of the separable convolutional neural network layers in the fourth stack 430 is followed by a ReLU activation layer. For example, the separable convolutional layers 416 is followed by the ReLU activation layer 418, and the separable convolutional layer 422 is followed by the ReLU activation layer 424. Each ReLU activation layer is configured to apply a ReLU activation function to an output of the preceded separable convolutional layer to generate an intermediate output that is provided as input to the next separable convolutional layer, or if there are no separable convolutional layers following the current ReLU activation layer, as the fourth stack output 442.

The exit module 400 further includes an average pooling layer 426 that is configured to perform average pooling on the fourth stack output 442 to generate an exit output 428. The exit output 428 is a separable convolution output of a separable convolution subnetwork, e.g. the separable convolution output 122 of the separable convolution subnetwork 150 of FIG. 1.

Figure 5:
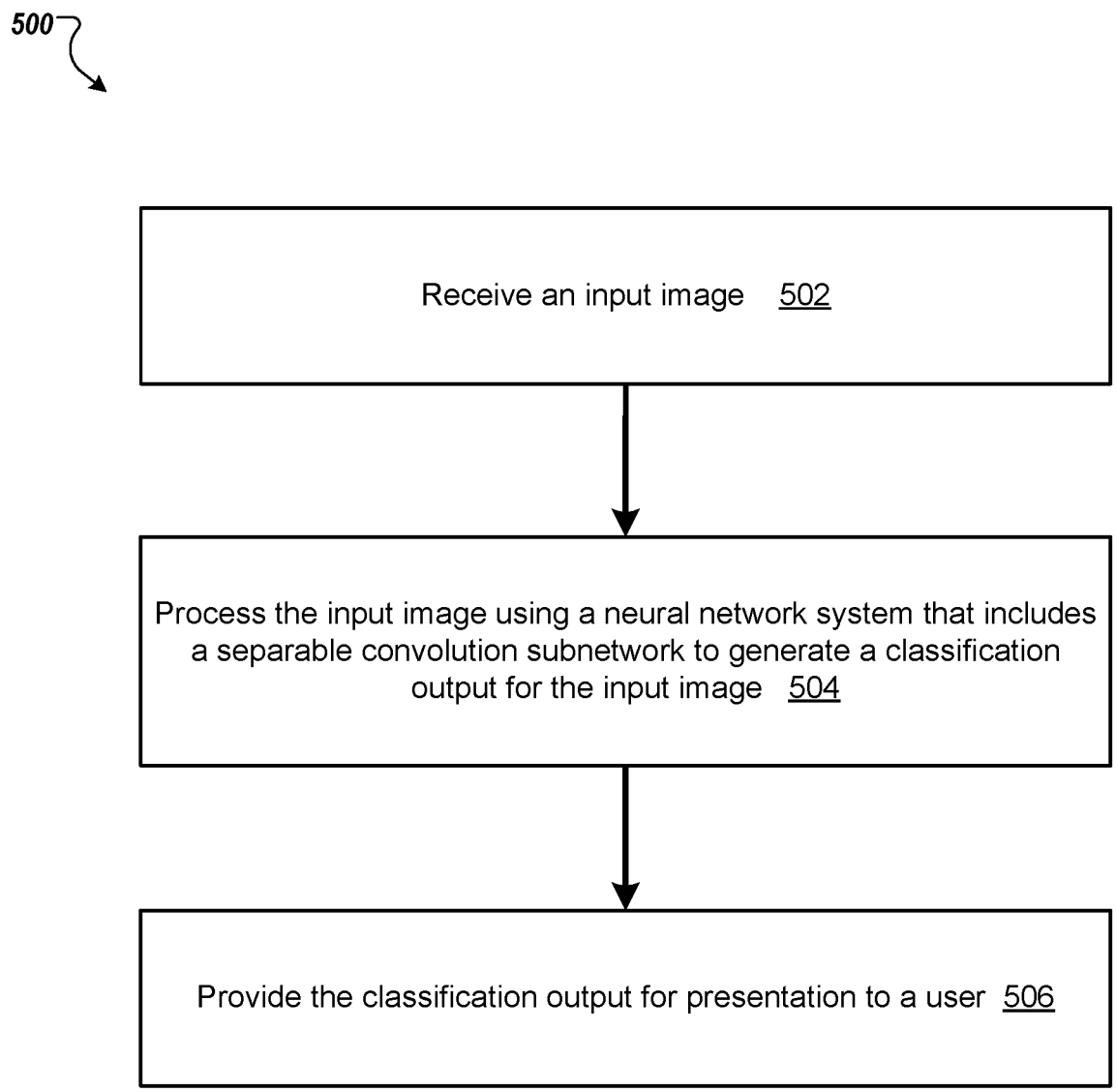
FIG. 5 is a flow diagram of an example process for generating a classification output for an input image.

FIG. 5 is a flow diagram of an example process 500 for generating a classification output for an input image. For convenience, the process 500 will be described as being performed by a system of one or more computers located in one or more locations. For example, a neural network system, e.g., the neural network system 100 of FIG. 1, appropriately programmed in accordance with this specification, can perform the process 500.

The system receives an input image (step 502).

The system processes the input image using a neural network system that includes a separable convolution subnetwork, e.g., the separable convolution subnetwork 150 of FIG. 1, to generate a network output for the input image (step 504). In some implementations, the system first processes the input image using an input subnetwork to generate an initial output that is fed as input to the separable convolution subnetwork.

The separable convolution subnetwork includes a sequence of modules including one or more entry modules followed by one or more middle modules followed by an exit module. Each module in the sequence includes multiple separable convolutional neural network layers arranged in a stack one after the other. The system processes the input image or data derived from the input image (e.g., the initial output generated by the input subnetwork) through each of the modules in the sequence to generate a separable convolution output for the separable convolution subnetwork.

In some implementations, the system processes the separable convolution output using an output subnetwork to generate a network output for the input image. In some implementations, the output subnetwork includes a softmax layer and, optionally, one or more fully-connected layers preceding the softmax layer, that collectively process the separable convolution output to generate the network output for the input image. In some other implementations, the output subnetwork includes a logistic regression layer and, optionally, one or more fully-connected neural network layers preceding the logistic regression layer, that collectively process the separable convolution output to generate the network output for the input image.

Generally, the network output generated by the system can be any kind of score, regression, or classification output based on the image processing task that the system is configured to perform. For example, if the system is configured to perform an image classification or recognition task, the network output generated by the output layer may include a respective score for each of a predetermined set of object categories, with the score for a given object category representing the likelihood that the input image contains an image of an object that belongs to the object category. As another example, for an object detection task, the output generated by the system can identify a location, a size, or both, of an object of interest in the input image. As yet another example, the output generated by the system can be the output of one of the hidden layers of the network and can be provided for use as a numeric representation, i.e., a numeric embedding, of the input image.

The system then provides the network output or data derived from the network output for presentation to a user (step 506). In some implementations, the output derived from the network output can be, e.g., data identifying one or more highest-scoring object categories. The system can provide the network output or the derived output for display on a user interface of a user device of the user. In some implementations, instead of or in addition to providing the network output or the data derived from the network output for presentation to the user, the system stores the network output or data derived from the network output in association with the input image The system can train the separable convolution subnetwork and, if included, the input and output subnetworks on labeled training data using conventional supervised learning techniques, e.g., stochastic gradient descent with backpropagation. That is, the system can train the separable convolution subnetwork and, if included, the input and output subnetworks on labeled training data to determine trained values of the parameter of the subnetworks from initial values of the subnetworks using a supervised learning technique.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A neural network system implemented by one or more computers, wherein the neural network system is configured to receive an input image and to generate a network output for the input image, and wherein the neural network system comprises:
a separable convolution subnetwork comprising a plurality of separable convolutional neural network layers arranged in a stack one after the other, wherein each separable convolutional neural network layer is configured to:
separately apply both a depthwise convolution and a pointwise convolution during processing of an input to the separable convolutional neural network layer to generate a layer output,
wherein the depthwise convolution comprises a spatial convolution applied independently to each channel of the input, and the pointwise convolution comprises a 1×1 convolution.

2. The neural network system of claim 1, further comprising:
an output subnetwork configured to receive a separable convolution output generated by the separable convolution subnetwork and to process the separable convolution output to generate the network output for the input image.

3. The neural network system of claim 1, further comprising:
an input subnetwork configured to receive the input image and to process the input image to generate an initial output.

4. The neural network system of claim 3, wherein the input subnetwork comprises one or more convolutional neural network layers.

5. The neural network system of claim 3, wherein the separable convolution subnetwork comprises one or more entry modules, and wherein the entry modules are configured to receive the initial output and to collectively process the initial output to generate an entry output.

6. The neural network system of claim 5, wherein each entry module comprises:
a respective first pass-through convolutional layer configured to process a module input for the entry module to generate a first pass-through output;
a respective first stack of separable convolutional neural network layers, wherein the layers in the first stack are configured to collectively process the module input to generate a first stack output;
a respective max pooling layer configured to perform max pooling on the first stack output to generate a max pooled output; and
a respective first concatenation layer configured to concatenate the first pass-through output and the max pooled output to generate an entry module output for the entry module.

7. The neural network system of claim 6, wherein the first pass-through convolutional layer is a 1×1 convolutional layer.

8. The neural network system of claim 6, wherein the separable convolutional neural network layers in the first stack are separated by a rectified linear unit activation layer.

9. The neural network system of claim 6, wherein one or more of the separable convolutional neural network layers in the first stack are followed by a batch normalization layer.

10. The neural network system of claim 5, wherein the separable convolution subnetwork includes three entry modules.

11. The neural network system of claim 5, wherein the separable convolution subnetwork comprises one or more middle modules, and wherein the middle modules are configured to receive the entry output and to collectively process the entry output to generate a middle output.

12. The neural network system of claim 11, wherein each middle module comprises:
a respective second pass-through convolutional layer configured to process a module input for the middle module to generate a second pass-through output;
a respective second stack of separable convolutional neural network layers, wherein the layers in the second stack are configured to collectively process the module input to generate a second stack output; and
a respective second concatenation layer configured to concatenate the second pass-through output and the second stack output to generate a middle module output for the middle module.

13. The neural network system of claim 12, wherein the second pass-through convolutional layer is a 1×1 convolutional layer.

14. The neural network system of claim 12, wherein each separable convolutional neural network layer in the second stack is preceded by a rectified linear unit activation layer.

15. The neural network system of claim 12, wherein one or more of the separable convolutional neural network layers in the second stack are followed by a batch normalization layer.

16. The neural network system of claim 11, wherein the separable convolution subnetwork includes eight middle modules.

17. The neural network system of claim 11, wherein the separable convolution subnetwork comprises an exit module, and wherein the exit module is configured to receive the middle output and to process the middle output to generate a separable convolution output for the separable convolution subnetwork.

18. The neural network system of claim 17, wherein the exit module comprises:
a third pass-through convolutional layer configured to process the middle output to generate a third pass-through output;
a third stack of separable convolutional neural network layers, wherein the layers in the third stack are configured to collectively process the middle output to generate a third stack output;
a third max pooling layer configured to perform max pooling on the third stack output to generate a third max pooled output; and
a third concatenation layer configured to concatenate the third pass-through output and the third pooled output to generate a concatenated output.

19. The neural network system of claim 18, wherein the third pass-through convolutional layer is a 1×1 convolutional layer.

20. The neural network system of claim 18, wherein each separable convolutional neural network layer in the third stack is preceded by a rectified linear unit activation layer.

21. The neural network system of claim 18, wherein one or more of the separable convolutional neural network layers in the third stack are followed by a batch normalization layer.

22. The neural network system of claim 18, wherein the exit module further comprises:

a fourth stack of separable convolutional neural network layers, wherein the layers in the fourth stack are configured to collectively process the concatenated output to generate a fourth stack output; and an average pooling layer configured to perform average pooling on the fourth stack output to generate the separable convolution output.

23. The neural network system of claim 22, wherein one or more of the separable convolutional neural network layers in the fourth stack are followed by a batch normalization layer.

24. The neural network system of claim 18, wherein each separable convolutional neural network layer in the fourth stack is followed by a rectified linear unit activation layer.

25. One or more non-transitory storage media encoded with instructions that, when implemented by one or more computers, cause the one or more computers to perform operations comprising:

receiving an input image; and processing the input image using a neural network system to generate a network output for the input image, wherein the neural network system comprises:

a separable convolution subnetwork comprising a plurality of separable convolutional neural network layers arranged in a stack one after the other, wherein each separable convolutional neural network layer is configured to:

separately apply both a depthwise convolution and a pointwise convolution during processing of an input to the separable convolutional neural network layer to generate a layer output;

wherein the depthwise convolution comprises a spatial convolution applied independently to each channel of the input, and the pointwise convolution comprises a 1×1 convolution.

26. A computer-implemented method comprising:

receiving an input image; and processing the input image using a neural network system to generate a network output for the input image, wherein the neural network system comprises:

a separable convolution subnetwork comprising a plurality of separable convolutional neural network layers arranged in a stack one after the other, wherein each separable convolutional neural network layer is configured to:

separately apply both a depthwise convolution and a pointwise convolution during processing of an input to the separable convolutional neural network layer to generate a layer output, wherein the depthwise convolution comprises a spatial convolution applied independently to each channel of the input, and the pointwise convolution comprises a 1×1 convolution.

* * * * *

UNITED STATES PATENT AND TRADEMARK OFFICE
CERTIFICATE OF CORRECTION

| | | |
|---|---|---|
| PATENT NO. | : 11,593,614 B2 | Page 1 of 1 |
| APPLICATION NO. | : 16/338963 | |
| DATED | : February 28, 2023 | |
| INVENTOR(S) | : Chollet et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this
Thirty-first Day of December, 2024

Derrick Brent
*Acting Director of the United States Patent and Trademark Office*